(12) United States Patent
Yoshitake et al.

(10) Patent No.: US 8,705,024 B2
(45) Date of Patent: Apr. 22, 2014

(54) WAVEFRONT ABERRATION MEASURING METHOD AND DEVICE THEREFOR

(75) Inventors: Yasuhiro Yoshitake, Yokohama (JP); Minoru Yoshida, Yokohama (JP); Keiko Oka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 260 days.

(21) Appl. No.: 13/145,212

(22) PCT Filed: Jan. 22, 2010

(86) PCT No.: PCT/JP2010/000345
§ 371 (c)(1),
(2), (4) Date: Oct. 13, 2011

(87) PCT Pub. No.: WO2010/092750
PCT Pub. Date: Aug. 19, 2010

(65) Prior Publication Data
US 2012/0019813 A1    Jan. 26, 2012

(30) Foreign Application Priority Data

Feb. 13, 2009    (JP) .................................. 2009-030640

(51) Int. Cl.
*G01J 1/00*    (2006.01)

(52) U.S. Cl.
USPC ........................................................ 356/213

(58) Field of Classification Search
USPC ......................................................... 356/213
See application file for complete search history.

(56) References Cited

U.S. PATENT DOCUMENTS 5,745,296 A  *  4/1998  Nakamura et al. ............. 359/641
2002/0159048 A1 * 10/2002  Inoue et al. .................... 356/121

FOREIGN PATENT DOCUMENTS

JP    2004-014764    1/2004
JP    2006-030016    2/2006

* cited by examiner

*Primary Examiner* — Tarifur Chowdhury
*Assistant Examiner* — Omar Nixon
(74) *Attorney, Agent, or Firm* — McDermott Will & Emery LLP

(57) ABSTRACT

Measurement cannot be made when trying to measure a wavefront aberration of a wide-angle lens, being wide in a field of view, comparing to a focus distance, by a Shack-Hartmann sensor, since an inclination of the wavefront exceeds an allowable value of inclination of the Shack-Hartmann sensor. The Shack-Hartmann sensor is inclined at a position of a pupil of a lens, and is controlled so that it lies within the allowable value mentioned above. Photographing is made through step & repeat while overlapping at the same position, to compose in such a manner that overlapping spots are piled up, and thereby measuring the wavefront aberration of the lens having a large pupil diameter.

9 Claims, 11 Drawing Sheets

WAVEFRONT ABERRATION MEASURING METHOD AND DEVICE THEREFOR

RELATED APPLICATIONS

This application is the U.S. National Phase under 35 U.S.C. §371 of International Application No. PCT/JP2010/000345, filed on Jan. 22, 2010, which in turn claims the benefit of Japanese Application No. 2009-030640, filed on Feb. 13, 2009, the disclosures of which Applications are incorporated by reference herein.

TECHNICAL FIELD

The present invention relates to a wavefront aberration measuring method and a device therefore, for a lens mounted on an optical apparatus, such as, a semiconductor optical inspection apparatus or a printed-circuit board machining apparatus, etc.

BACKGROUND ART(S)

An optical inspection apparatus for a semiconductor wafer is an apparatus for detecting a foreign matter(s) on the wafer, thereby to manage a number of the foreign materials. Because of difference of sizes between the foreign matters to be managed, depending on a manufacturing process of the semiconductor, in the inspection apparatus is provided a function of changing an optical magnification or power. If enlarging the optical power, it is possible to detect the foreign matters, being small much more, on the other hand, a field of view, which can be detected by a sensor, also comes to small, and therefore, throughput goes down to small. Accordingly, on the semiconductor manufacturing line, in particular, limiting to a process or a step necessitating a fine or minute management, an inspection is conducted while enlarging the optical power. A detecting system of the inspection apparatus is built up with an objective lens and an imaging lens, and change of the optical power is carried out, in general, by changing the focus distance of the imaging lens.

On a line for manufacturing a large amount of wafers is applied plural numbers of optical inspection apparatuses. A permissible value of pieces of the foreign matters is already determined, in advance, on each of the manufacturing processes or steps, and when the number of pieces exceeds that permissible number, then a countermeasure for is taken, for example, cleaning of the apparatus, etc. Herein, if there is difference in sensitivities (i.e., sizes of detectable foreign matters) between an optical inspection apparatuses "A" and "B", it is necessary to determine or set up the permissible for each optical inspection apparatus; i.e., bringing about a large barrier on the operation thereof. The sensitivity of the optical inspection apparatus depends, largely, upon an imaging capacity of lenses of the detecting system. Accordingly, for the purpose of reducing the sensitivity of the optical inspection apparatus, it is necessary to execute the management of an imaging lens, as a unit, in particular, the management of the wavefront aberration thereof.

As a method for measuring the wavefront aberration of a lens is already known a method of applying Shack-Hartmann wavefront sensor (hereinafter, "Shack-Hartmann sensor") therein, as is described in the Patent Document 1 (Japanese Patent Laying-Open No. 2004-14764). The Shack-Hartmann sensor is a sensor for photographing the wavefront (i.e., phase distribution) of lights entering upon the sensor, dividing and condensing that by means of an array lens, in the form of an image of alignment of plural numbers of spots, on a 2-dimensional sensor, and it calculates a wavefront aberration coefficient from the position shift of the spot alignment.

A method for calculating the wavefront aberration or the wavefront aberration coefficient is already disclosed in the Patent Document 1 (Japanese Patent Laying-Open No. 2004-14764) mentioned above or the Patent Document 2 (Japanese Patent Laying-Open No. 2006-30016). Measurement of the wavefront aberration by means of Shack-Hartmann sensor is advantageous in the following aspects; (1) it is hardly influenced by change of the environment, such as, temperature change of an air within an optical path, or vibrations, etc., (2) it is applicable also to a local change of the wavefront, being equal or larger than the measurement wavelength, which is generated on an spherical lens, etc., comparing to the method by an interferometer, being a main current conventionally. In this prior art, an object of measurement is a projection lens in a photolithography system. On the other hand, the lens of the detection system of the optical inspection apparatus is made up with the objective lens and the imaging lens.

As was mentioned above, for the purpose of changeability of the optical power, the focus distance of the imaging lens is changed. This may be achieved by exchanging the imaging lens, or applying a zoom lens to it. Although the wavefront aberration can be measured with using the objective lens and the imaging lens as one (1) set, like the projection lens, but there is no knowing that the aberration obtained is a result of cancelling a plus aberration generated on the objective lens by a minus aberration of the imaging lens. In this instance, if changing it to an imaging lens having the different focus distance, there is a possibility that the aberration changes largely. Accordingly, it is preferable to measure the aberration of the objective lens, as a unit. However, since the objective lens, as a unit, forms no image (i.e., an infinite system), it is necessary to adopt other measuring method, having the structure different from that shown in the prior arts mentioned above.

Also in a laser machining apparatus for use of the printed-circuit board, similar to the objective lens in the optical inspection apparatus for use of the semiconductor, an fθ lens of the indefinite system is applied. In this apparatus, parallel lights are deflected by a galvano-mirror, which is provided at a position of a pupil of the fθ lens, to enter on the fθ lens, and thereby scanning on the printed-circuit board by a condensed light beam. The fθ lens is a lens, being given with distortion thereon, intentionally, so that a beam position is determined on the printed-circuit board by a product fθ of the deflection angle of lights upon the galvano-mirror and the focus distance of the fθ lens. Since also the fθ lens is not the imaging lens, it is necessary to adopt other measuring method, differing from that of the conventional imaging type. In the laser machining apparatus, since the aberration of the fθ lens gives an influence upon a machining configuration at each scanning position of the condensed light beam, for the purpose of obtaining a uniform machining configuration within a region of the scanning, it is necessary to conduct the management upon the aberration (i.e., the wavefront aberration).

With the wavefront aberration measurement, applying the Shack-Hartmann sensor mentioned above therein, measurement is made on the aberrations, including the aberrations of the lens array of a measurement optical system and/or a relay lens, other than the aberration of the lens, i.e., a measuring object. Then, in the Patent Document 1 (Japanese Patent Laying-Open No. 2004-14764) is disclosed a method for calculating the aberration of the measurement optical system, i.e., by subtracting the data of the lens, i.e., the measuring object, as a unit, from data including the aberration of the measurement optical system, while having conducted the measurement of the lens, i.e., the measuring object, as a unit thereof, with using a separate means, such as, an interferometer, etc.

On the other hand, in the Patent Document 2 (Japanese Patent Laying-Open No. 2006-30016) is disclosed a method for cancelling the aberration of the measurement optical system therefrom, so as to calculate the aberration of only the lens, i.e., the measuring object; by measuring only the lens, i.e., the measuring object, two (2) times, while changing a posture thereof, such as, rotating, etc., and obtaining a difference for each measurement value.

PRIOR ART DOCUMENT(S)

Patent Document

Patent Document 1: Japanese Patent Laying-Open No. 2004-14764 (2004); and
Patent Document 2: Japanese Patent Laying-Open No. 2006-30016 (2006).

BRIEF SUMMARY OF THE INVENTION

Problem(s) to be Dissolved by the Invention

The objective lens of the optical inspection apparatus or the fθ lens of the laser machining apparatus, being mentioned above, is a lens of an infinite system, which cannot form an image by itself as a unit. In FIG. 12 is shown the structure when measuring the wavefront aberration of the objective lens of the infinite system by means of Shack-Hartmann sensor 4. The lights condensed at a point "A" by the condenser lens 10 enter onto the objective lens 2, and after being converted into parallel lights, enter into a pupil (an aperture) 21, and thereafter they are detected by the Shack-Hartmann sensor 4 in the form of parallel lights, but after being condensed once through a relay lens 300, which is built up with relay lenses 301 and 302.

The relay lens 300, on the other hand, forms an image of the pupil 21 on the Shack-Hartmann sensor 4. For the purpose of measuring the wavefront aberration at an end of the field of view, the condenser lens 10 condenses the lights at the point "A" locating at a distance "L" from an optical axis, and this point is determined to be a measuring point for measurement of the wavefront aberration. In this instance, an angle α of the parallel lights 410 entering into the pupil 21 can be presented as follows, with using the focus distance "f1" of the objective lens 410 and the distance "L":

$$\tan \alpha = L/f1 \quad \text{(Eq. 1)}$$

On the other hand, a reducing magnification "M" of the relay lens 300 must satisfy the following equation, so that a diameter "Dep" of the pupil can be detected within a detection area "S" of the Shack-Hartmann sensor 4:

$$M < S/Dep \quad \text{(Eq. 2)}$$

Where, the pupil diameter "Dep" is as follows, when presenting an aperture ratio of the objective lens by "NA".

$$Dep = 2*f1*NA \quad \text{(Eq. 3)}$$

In this instance, an angle β entering on the Shack-Hartmann sensor 4 can be obtained by the following equation:

$$\tan \beta = \tan \alpha/M \quad \text{(Eq. 4)}$$

Herein, if assuming that the focus distance of the objective lens is 50 mm, "NA" is 0.5, and the distance L at the end of the field of view is 5 mm, respectively, then from the Eq. (3), the pupil diameter comes to Dep=2*50*0.5=50 mm. If assuming that the detection area "S" of the Shack-Hartmann sensor 4 is 15 mm, then from the Eq. (2), the reducing magnification comes to M=15/50=0.3. From the Eq. (1), since tan α=5/50=0.1, an incident or entering angle β on the Shack-Hartmann sensor 4 comes to, at least from the Eq. (4), tan β=0.1/0.3=0.33, and the angle is β=18.4 degrees.

Herein, explanation will be made on a limit of the incident or entering angle on the Shack-Hartmann sensor 4, by referring to FIG. 13. This FIG. 13 is a view for showing an inside of the Shack-Hartmann sensor 4. The wavefront 400 entering on the Shack-Hartmann sensor 4 is divided by the array lens 41. The light beam 401 entering at the position (λ,η) of the wavefront 400 is condensed at the position, shifting from the position (ξ,η) by ΔX(ξ,η) on a 2-dimensional sensor 42 in accordance with the following equation.

$$\tan \theta = -\frac{\Delta X(\xi, \eta)}{f_4} = \frac{\partial W(\xi, n)}{\partial \xi} \quad \text{(Eq. 5)}$$

Herein, "W" means phase distribution, and "f4" the focus distance of the array lens 41, respectively.

On the other hand, an inclination θ of measurable wavefront must be nearly equal to or lower than 3 degree, so that the array lens 41 can form an image as a spot on the 2-dimensional sensor 42. Accordingly, as was mentioned above, if the incident angle upon the Shack-Hartmann sensor 4 comes up to 18.4 degrees, then it dissatisfies the condition of being equal or less than 3 degree, and therefore measurement cannot be made. Namely, with such general method of forming an image of the pupil 21 of the objective lens 2 on the Shack-Hartmann sensor 4 through the relay lens 300, it is impossible to measure the wavefront aberration of the objective lens 2. Then, an object of the present invention is to provide a method for measuring the wavefront aberration, clearing the limit of the incident or entering angle onto the Shack-Hartmann sensor 4, when applying the relay lens therein.

Next, explanation will be made, relating to other one problem to be dissolved. According to the Patent Document 2 (Japanese Patent Laying-Open No. 2006-30016), though it relates to the method for obtaining the difference of the position shift of an object on the Shack-Hartmann sensor 4, by making the measurement thereof two (2) times while rotating by 90 degree, for example; however, in case where the object is an aberration, being rotationally symmetric, such as, a spherical aberration, for example, the difference comes to zero (0), i.e., it is impossible to calculate the aberration. Therefore, another object of the present invention is to provided a measuring method for enabling correction of the aberration in the measurement optical system, even for the aberration rotationally symmetric.

Means for Dissolving the Problem(s)

For accomplishing the object mentioned above, according to the present invention, there is adopted the structure of disposing the Shack-Hartmann sensor at the position of the pupil of the objective lens, directly, without providing the relay lens. With this, it is possible to reduce an incident angle upon the Shack-Hartmann sensor. However, as was mentioned above, since it cannot be disposed to be equal to or less than 3 degrees, being as an allowable value, the Shack-Hartmann sensor is inclined in an inclination angle of the wavefront. With this, it is possible to clear away or remove such a limit that the inclination angle upon the Shack-Hartmann sensor should be equal to or less than 3 degrees.

Also, since the pupil diameter exceeds the field of view for detection of the 2-dimensional sensor within the Shack-Hartmann sensor, it is possible to cover an entire area or region of the pupil diameter, by scanning the Shack-Hartmann sensor. As a method for scanning the Shack-Hartmann sensor, there are provided a method for scanning the 2-dimensional sensor through step & repeat, in a 2-dimensional manner, and also a method for scanning it, in a 1-dimensional manner, the pupil diameter by the 1-dimensional sensor covering the pupil diameter.

In the former, since pitching and yawing of the scanning stage gives an ill influence upon an error of the position of a spot light condensed when composing an entire area or region of the pupil, there is applied a method of measuring the pitching and yawing of the scanning stage by a 3-axis laser measuring apparatus or an auto-collimator, and thereby correcting or compensating the error. In the latter, since a shift of pitching and yawing of the scanning stage result into an error, there is applied a method of measuring them by a 2-dimensional laser measuring apparatus, thereby correcting or compensating the error. With applying those methods therein, it is possible to measure the wavefront aberration on the entire area or region of the sensor exceeding the field of view for detection thereof.

Within other invention for clearing away or removing the limit of the incident angle upon the Shack-Hartmann sensor, the incident angle β upon the Shack-Hartmann sensor is always determined to zero (0), by correcting or compensating an inclination of the wavefront at the position of pupil, which is generated at an end of the field of view, by a galvano-mirror disposed at the position of the pupil. With this, it is possible to clear away or remove the limitation of the incident angle, even when forming an image of the pupil, while reducing it within the field of view of the sensor by a relay lens.

As an invention for measuring an aberration of a measuring optical system, data is measured on a position shift of the spot light due to the aberration of the Shack-Hartmann sensor itself, by measuring a spherical wave generating at a point light source is measured by the, directly, without applying other optical system, and this data is subtracted from data when measuring an objective lens. With this, it is possible to calculate the wavefront aberration of only the objective lens, and also to measure the wavefront aberration, being rotationally symmetric, which cannot be measured by the conventional example.

Effect(s) of the Invention

According to the present invention, since it is possible to make the incident or entering angle onto the Shack-Hartmann sensor small, it is possible to make the measure of the wavefront aberration on the objective lens of the infinite system, by means of the Shack-Hartmann sensor, and therefore achieving the measurement, which is hardly influenced by the environment, comparing to that of the conventional interferometer, etc. And, it is also possible to make the measurement of the wavefront aberration, at high accuracy, only upon the lens as an object of measurement, by measuring the wavefront aberration of the Shack-Hartmann sensor itself, directly, with using a point-like light source.

With management of the wavefront aberration of the lens, by such means as was mentioned above, the sensitivity of detecting the foreign matter(s) and/or the machining configuration of the semiconductor optical inspection apparatus or the laser machining apparatus for the printed-circuit board can be uniformed, and therefore there can be obtain effects, such as, increasing an efficiency of operating plural numbers of the optical inspection apparatuses in the semiconductor manufacturing line, and improving the quality of the laser machining.

DETAILED DESCRIPTION OF THE PREFERRED EMBODIMENTS

Figure 1:
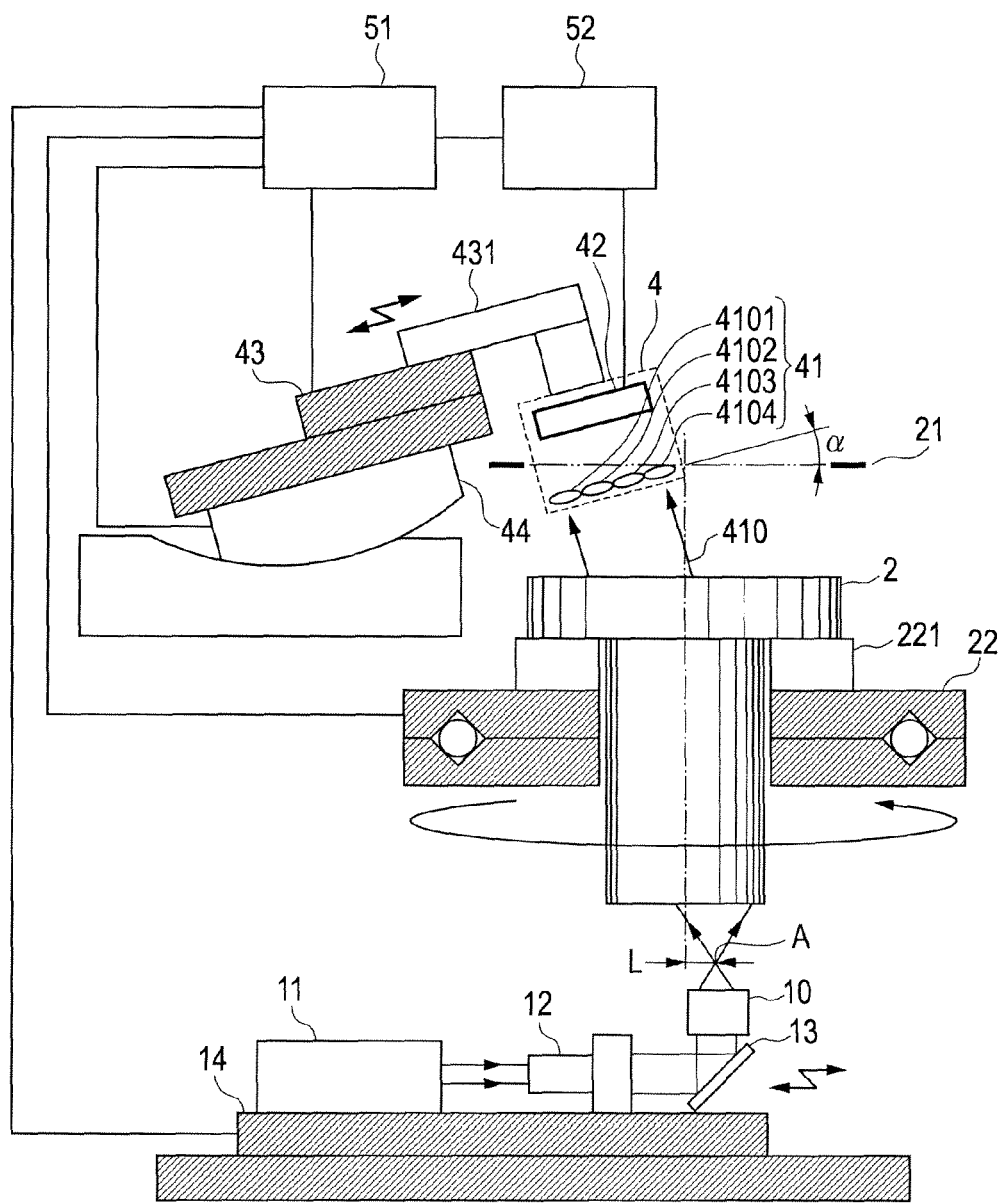
FIG. 1 is a front cross-sectional view for showing an outlook structure of a wavefront aberration measuring device, according to a first embodiment.

In a Shack-Hartmann type measuring apparatus for measuring a wavefront aberration on the objective lens of an infinite system with using a point-like light source, scanning is made while inclining the Shack-Hartmann sensor to be in parallel with the wavefront, at a pupil position of the objective lens, depending on a position of the point-like light source. Pitching and yawing when the scanning is made are corrected, so as to obtain a spot position of condensed light, and with this, a wavefront aberration coefficient is calculated.

Explanation will be made on embodiments of the present invention, by referring to the drawings attached herewith.

Embodiment 1

A first embodiment of the present invention will be explained upon basis of FIGS. 1 to 4. FIG. 1 is an entire structure view of the present embodiment. A reference numeral 11 depicts a light source for emitting a parallel light therefrom, 12 a beam expander, 10 a light condenser lens, and 13 a reflection mirror for bending an optical path of light passing through the beam expander 12. A reference numeral 14 depicts a stage, on which the light source 11, the beam expander 12, the reflection mirror 13 and the light condenser lens 10 are mounted, and it has the structure of being movable at least in 1-axis direction.

A reference numeral 2 depicts an objective lens, 22 a rotation stage, holding the objective lens 2 therein and being rotatable, and 221 an attaching member for fixing the objective lens 2 on the rotation stage 22, respectively. The rotation stage 22 is retractable to a position completely coming off from an optical axis of the movable light condenser lens 10 in the direction perpendicular to the drawing surface, by means of a driving mechanism, which is not shown in the figure, under a condition of holding the objective lens 2 thereon. A reference numeral 4 depicts the Shack-Hartmann sensor, 41 an array lens being constructed with a large number of minute lenses 4101, 4102, 4103 and 4104, which are aligned like an array within a plane (in FIG. 1 is shown an example of aligning four (4) pieces of the minute lenses, but they may be aligned by a much larger number thereof), 42 a 2-dimensional sensor, 43 a stage being movable at least in a 1-axis direction, 44 a gonio-stage, and 431 a supporting member fixed on the stage 43 for supporting the Shack-Hartmann sensor thereon, respectively.

The gonio-stage 44 is supported by a Z stage not shown in the figure, to be movable in up and down directions on the drawing surface. A reference numeral 51 depicts a controller system for controlling the stage 14, the rotation stage 22, the gonio-stage 44 and the stage 43. A reference numeral 52 depicts a processor system for processing an output signal from the 2-dimensional sensor 42 of the Shack-Hartmann sensor 4 with using a control signal of the controller system.

With such structure as was mentioned above, the parallel light emitting from the light source 11, which is mounted on the stage 14, after being enlarged by the beam expander 12, are condensed at a measuring point "A" by the light condenser lens 10. The light emitting from the point "A" enter onto the objective lens 2, being a lens to be measured, come to the parallel light being inclined depending on the position of that point "A", and enter on the Shack-Hartmann sensor 4, which is provided on the pupil 21 of the objective lens.

An inclination angle α of the Shack-Hartmann sensor 4 can be obtained from the focus distance "f1" of the objective lens 2 and the distance "L" between the optical axis and the point "A", with using the Eq. 1 mentioned above. The controller system 51 calculates the inclination angle α by the obtaining the position of the stage, and controls the gonio-stage 44 to be inclined by the inclination angle α. Apart of the parallel light 410 is divided by the array lens 41, and is photographed as a spot of condensed light on the 2-dimensional sensor 42, depending on the inclination of the wavefront of each part. Next, the controller system 51 drives the stage 43 so that the Shack-Hartmann sensor 4 moves to a next photographing position of a surface defining the inclination angle α between the pupil 21, and other part of the parallel light 410 is photographed. While repeating this operation, photographing is conducted on an entire of the pupil 21.

Figure 2A:
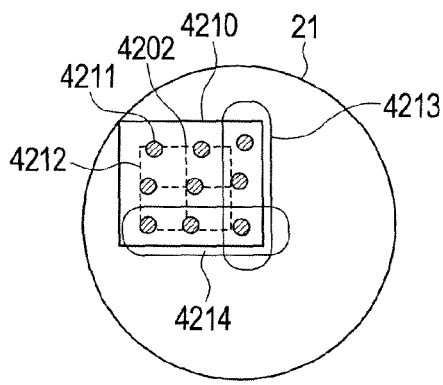
FIGS. 2A to 2E are plane views for showing a manner of photographing by a 2-dimensional sensor on a pupil of an objective lens, in the first embodiment.
Figure 2B:
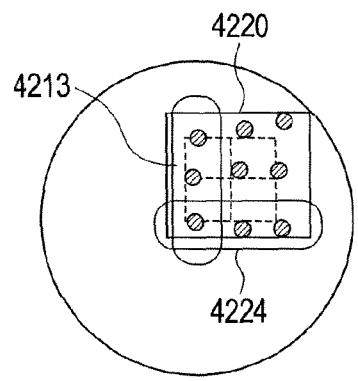
Figure 2C:
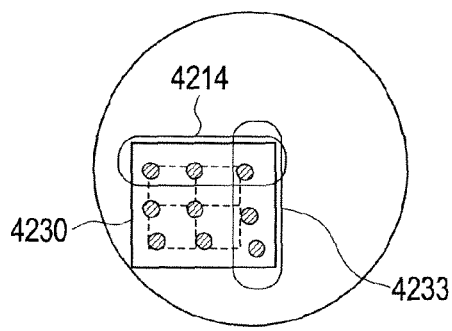
Figure 2D:
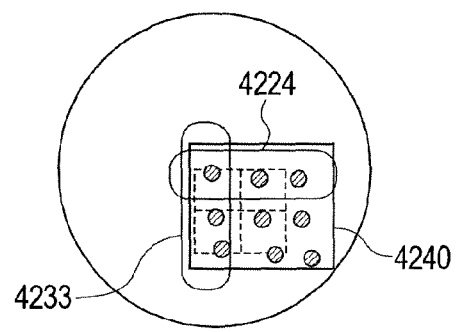

Next, explanation will be made in relation with a method for photographing, by referring to FIGS. 2A to 2E. FIG. 2A shows an area or region 4210 photographed by the 2-dimensional sensor 42, on the region of the pupil 21, when the stage 43 is at a first position. In the similar manner, FIGS. 2B, 2C and 2D show the photographing areas or regions 4220, 4230 and 4240, respectively, when the stage 43 is at a second, a third or a fourth position. Each of the photographing area or region 4210, 4220, 4230 and 4240 is so determined that it overlaps with in a part thereof, respectively.

Figure 2E:
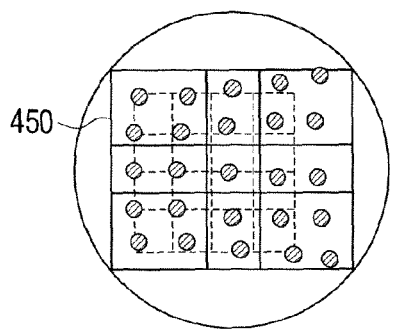

A lattice 4212, in particular, each intersecting point thereof shows a position of the spot position of condensed light from a viewpoint of design (i.e., under an ideal condition thereof), of each of the minute lenses, which build up the array lens 41. An actual spot 4211 of condensed light is shifted from this position, due to an aberration. The processor system 52, after obtaining a position of the center of gravity for the spot of condensed light on each picture or image, executes rotation movement and parallel movement onto each arrangement of the spots, so that coordinates of the arrangements 4213, 4214, 4224 and 4233 of overlapping spots on each picture or image are coincide with, and joins them; finally, obtaining a spot arrangement 450 composed, after being corrected on the position shifts thereof, as is shown in FIG. 2E. In this manner, by fitting them through the rotation movement and the parallel movement, the yawing and the pitching, being generated when moving by the stage 43, are corrected.

Herein, explanation will be given, in relation with the function of the rotation stage 22, on which the objective lens 2 is mounted. Since the wavefront aberration of the objective lens 2 changes depending on the measuring point "A" (i.e., the focus point "A" of the light condenser lens 10), being a relative position with respect to an optical axis 200 of the objective lens 2, there it must be measured all over the regions within the field of view of the objective lens 2. On the contrary to this, the gonio-stage 44 is an inclining stage having 1-axis, and the inclination angle thereof is controlled, with respect to the position of the measuring point "A" in a specific radial direction of the objective lens 2. For executing setup or determination of the measuring points other than this, the objective lens 2 is rotated by the rotation stage 22. For example, the controlling system 51 rotates the rotation stage 22, by every 22.5 degrees, and thereby enabling the measurement on almost of all fields of view of the objective lens 2.

Figure 3:
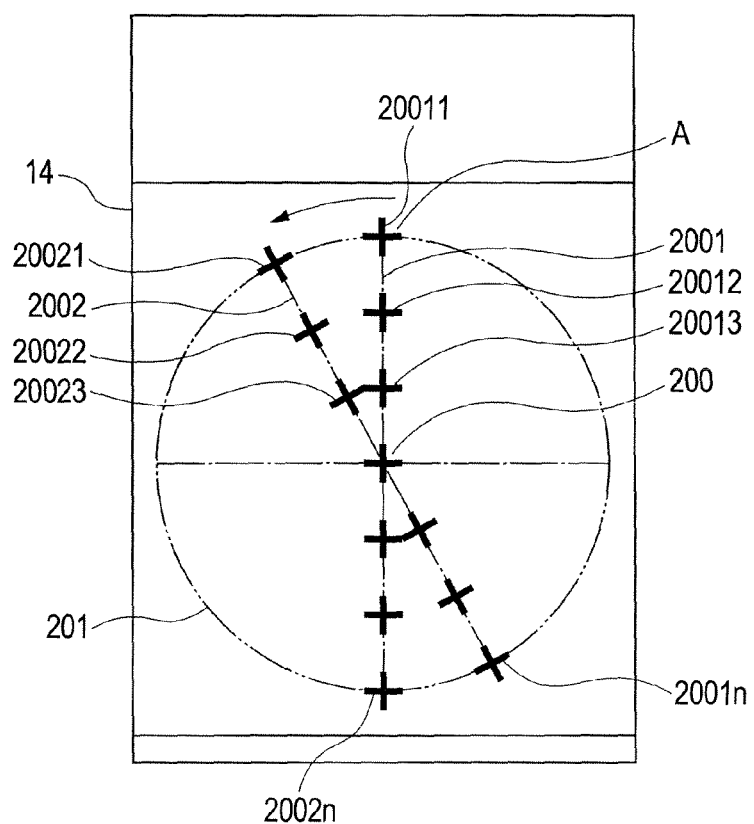
FIG. 3 is a plane view of the pupil for showing a rotation stage 22, on which the objective lens 2 is mounted, and a focusing point "A"

Thus, in the case shown in FIG. 3, the measurement is made on the wavefront aberrations at plural numbers of the measuring points 20011, 20012, 20013 . . . 2001n in the direction along with an axis 2001, while inclining the gonio-stage 44 into the 1-axis direction, under the condition of fixing the rotation stage 22 at a certain position, and next, the measurement is made on the wavefront aberrations at plural numbers of the measuring points 20021, 20022, 20023 . . . 2002n in the direction along with an axis 2002, while inclining the gonio-stage 44 into the 1-axis direction, similar manner, under the condition of fixing the rotation stage 22 after rotating it by 22.5 degrees. By repeating this, while rotating the rotation stage at a pitch of 22.5 degrees, it is possible to measure the wavefronts, upon almost all the entire areas or regions within the field of view 201 of the objective lens 2.

Figure 4:
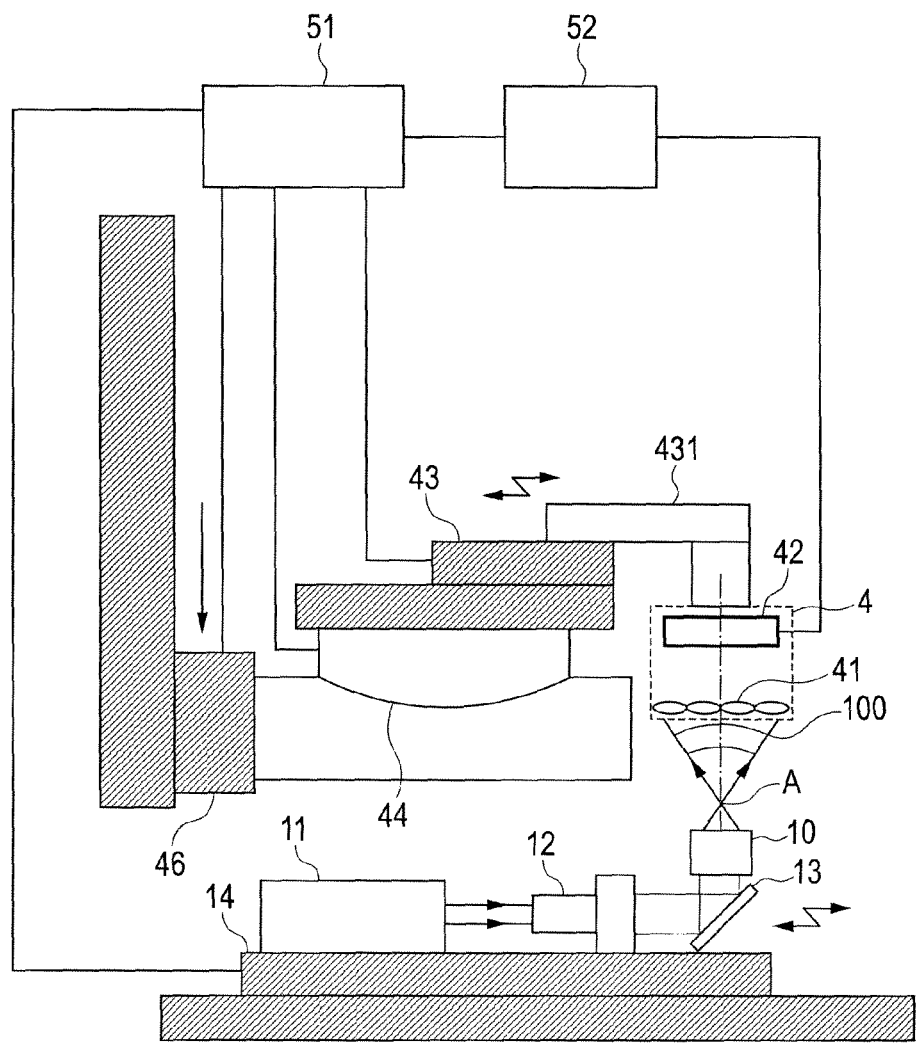
FIG. 4 is a front cross-sectional view for showing an outlook structure of the wavefront aberration measuring device, when measuring an aberration of an array lens.

Next, by referring to FIG. 4, explanation will be given on the correction method for correcting the position shift of the spot of condensed light, which is caused due to the aberration of the array lens 41. First of all, under the condition of retracting the rotation stage 22 from the optical axis of the light condenser lens 10, by the mechanism not shown in the figure, the controller system 51 drives a Z stage 46 being movable into the up and down directions on the drawing, and thereby moving it to such a position that a spherical wave 100 diverging from the measuring point "A" can enter on the entire of the array lens 41.

Now, assuming that the arrangement of the array lens 41 surrounding a center (0,0) of the array lens 41 is (i,j), the distance from the measuring point "A" to the array lens 41 is "R", and the pitches of the array lens are ΔPx and ΔPy in the X and Y directions thereof, then ideal values ΔX0(i,j) and ΔY0(i,j) on the lattice can be given by the following equations, at the spot of condensed light of the (i,j)$^{th}$ array lens:

$$\Delta X0(i,j)=\Delta Px*i*f4/R \quad \text{(Eq. 6)}$$

$$\Delta Y0(i,j)=\Delta Py*i*f4/R \quad \text{(Eq. 7)}$$

Where, "f4" is the focus distance of the array lens 41.

If assuming that the position shift of the spot of condensed light, which is actually measured by the 2-dimensional sensor 42 be ΔXs(i,j), ΔYs(i,j), then the position shift, ΔXa(i,j), ΔYa(i,j), which is caused due to the aberration of the array lens 41, can be obtained by the following equations:

$$\Delta Xa(i,j)=\Delta Xs(i,j)-\Delta X0(i,j) \quad \text{(Eq. 8)}$$

$$\Delta Ya(i,j)=\Delta Ys(i,j)-\Delta Y0(i,j) \quad \text{(Eq. 9)}$$

The processor system 52, memorizing the values, ΔXa(i,j), ΔYa(i,j), in advance, corrects the position shift of the spot of condensed light mentioned above, when measuring the objective lens, in accordance with the following equations:

$$\Delta Xm(i,j)=\Delta X(i,j)-\Delta Xa(i,j) \quad \text{(Eq. 10)}$$

$$\Delta Ym(i,j)=\Delta Y(i,j)-\Delta Ya(i,j) \quad \text{(Eq. 11)}$$

With such the process as was mentioned above, it is possible to measure the wavefront aberration of the objective lens 2, without receiving an ill influence of the aberration of the array lens 41.

Embodiment 2

Figure 5:
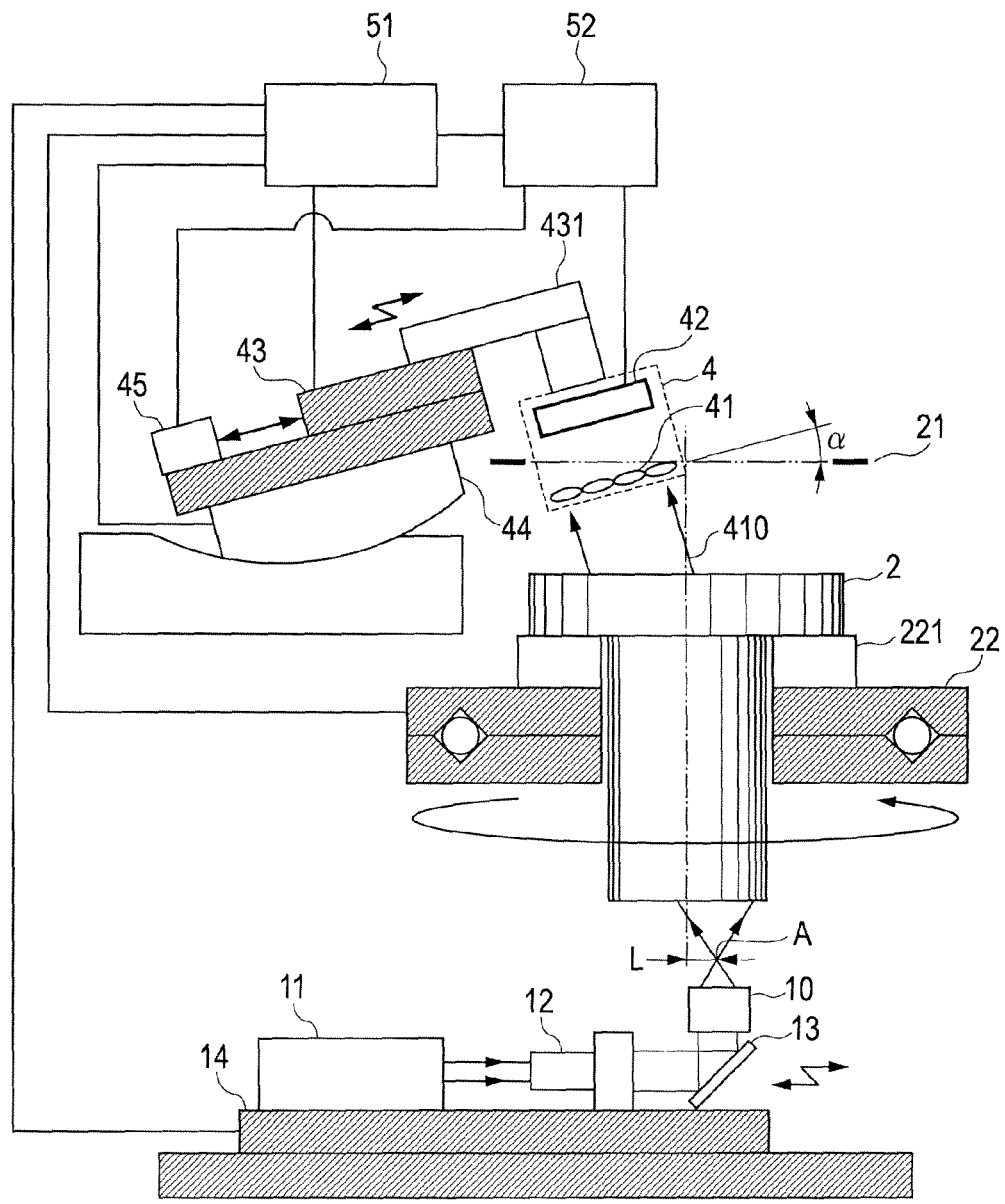
FIG. 5 is a front cross-sectional view for showing an outlook structure of a wavefront aberration measuring device, according to a second embodiment of the present invention.

A second embodiment of the present invention will be explained by referring to FIGS. 5 though 7. FIG. 5 shows the structure of the wavefront aberration measuring device, enabling to correct an error generated by the yawing and/or the pitching of the stage 23. The basic or fundamental structure thereof is similar to that of the first embodiment shown in FIG. 1, wherein the same reference numerals are attached to the same parts thereof. In the present embodiment, an auto-collimator 45 is attached on the stage 43 mounted on the gonio-stage 44, differing from the first embodiment shown in FIG. 1, in this respect. The auto-collimator 45 measures the yawing angle ω and/or the pitching angle γ of the stage 43, and thereby sending them to the processor system 52.

Figure 6A:
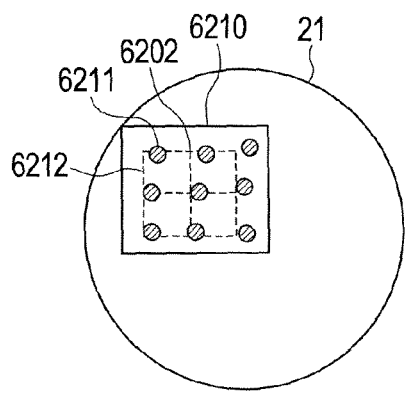
FIGS. 6A to 6E are plane views for showing a manner of photographing by the 2-dimensional sensor on the pupil of the objective lens, in the second embodiment.
Figure 6B:
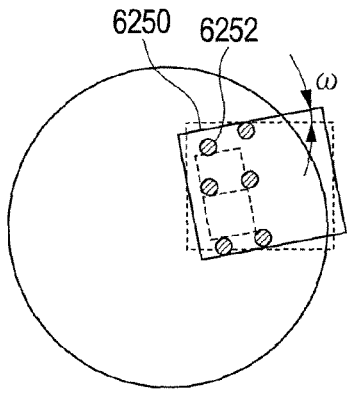
Figure 6C:
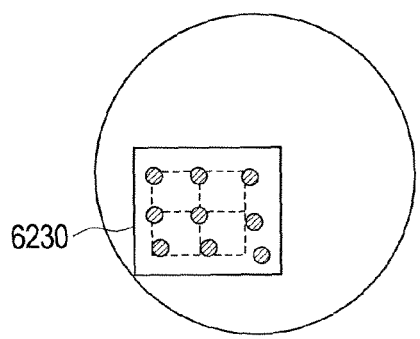
Figure 6D:
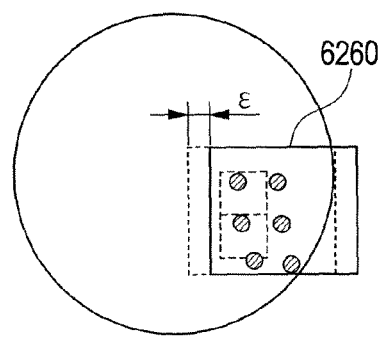

In FIGS. 6A to 6E are shown the manner of photographing, in case when the yawing angle ω and/or the pitching angle γ are/is generated. The conditions shown in FIGS. 6A to 6D are basically same to those shown in FIGS. 2A to 2D, and in FIG. 6A is shown the area or region 4210 photographed by the 2-dimensional sensor 42, on the region of the pupil 21 of the objective lens 2, when the stage 43 is at the first position thereof. Similarly, FIGS. 6B, 6C and 6D show the photographing regions 6220, 6230 and 6240 when the stage 43 is at the second, third and fourth positions, respectively. A lattice 6212, in particular, each intersecting point thereof shows a position of the spot position of condensed light from a viewpoint of design (i.e., under an ideal condition thereof), of each of the minute lenses (4101, 4102, 4103 and 4104 shown in FIG. 1), which build up the array lens 41. The actual spot 6211 (position shown by ● in FIGS. 6A through 6D) of condensed light is shifted from this position, due to an aberration.

The processor system 52 receiving the signal from the auto-collimator 45 executes conversion of the coordinates by the following equation, with using the yawing error ω measured, and corrects the arrangement of the spot 6252 by modifying the shift of the photographing region 6250, as is shown in FIG. 6B.

$$\begin{bmatrix} X' \\ Y' \end{bmatrix} = \begin{bmatrix} \cos(-\omega) & -\sin(-\omega) \\ \sin(-\omega) & \cos(-\omega) \end{bmatrix} \begin{bmatrix} X \\ Y \end{bmatrix} \quad \text{(Eq. 12)}$$

Figure 7:
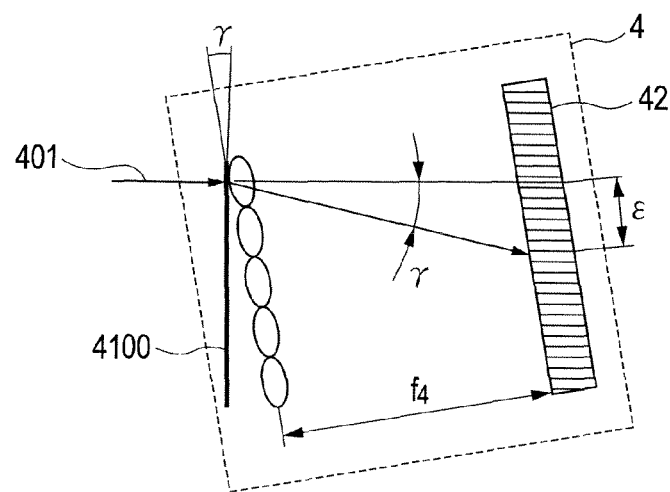
FIG. 7 is a plane cross-sectional view of the Shack-Hartmann sensor, for explaining a position shift of a light focusing spot on the 2-dimensional sensor when a stage has pitching.

Next, explanation will be given on a relationship between the pitching error γ of the stage 43 and an error ε on the 2-dimensional sensor 42, by referring to FIG. 7. In this case, there is no necessity of photographing while overlapping the spot arrangement between the pictures, as was explained in the embodiment 1. When the 2-dimensional sensor 42 is inclined by γ through the pitching of the stage 43, a shift volume 8 on the 2-dimensional sensor 42, which is supported by the supporting member 431 fixed on the stage 43, can be obtained from the following equation:

$$\epsilon=f4*\tan\gamma \quad \text{(Eq. 13)}$$

Herein, "f4" is the focus distance of the array lens 41. The processor system 52 calculates the shift volume 8 from the pitching angle γ, which is measured by the auto-collimator 45, and corrects the spot arrangement 4260, as is shown in FIG. 6D.

Figure 6E:
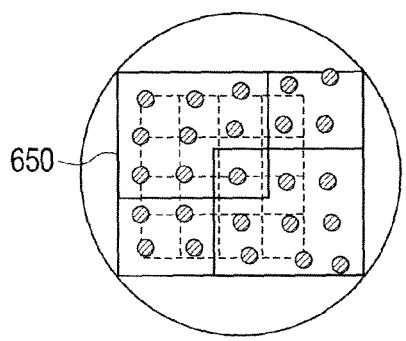

In this manner, with measuring the error of movement of the stage 43 by the auto-collimator 45, it is possible to correct the error of the spot arrangement on the pictures, obtained by photographing at each position of the stage 43, and by composing each picture characterizing this error, it is possible to obtain the spot arrangement 650, being corrected on the position shift, as is shown in FIG. 6E and composed with.

Embodiment 3

Figure 8:
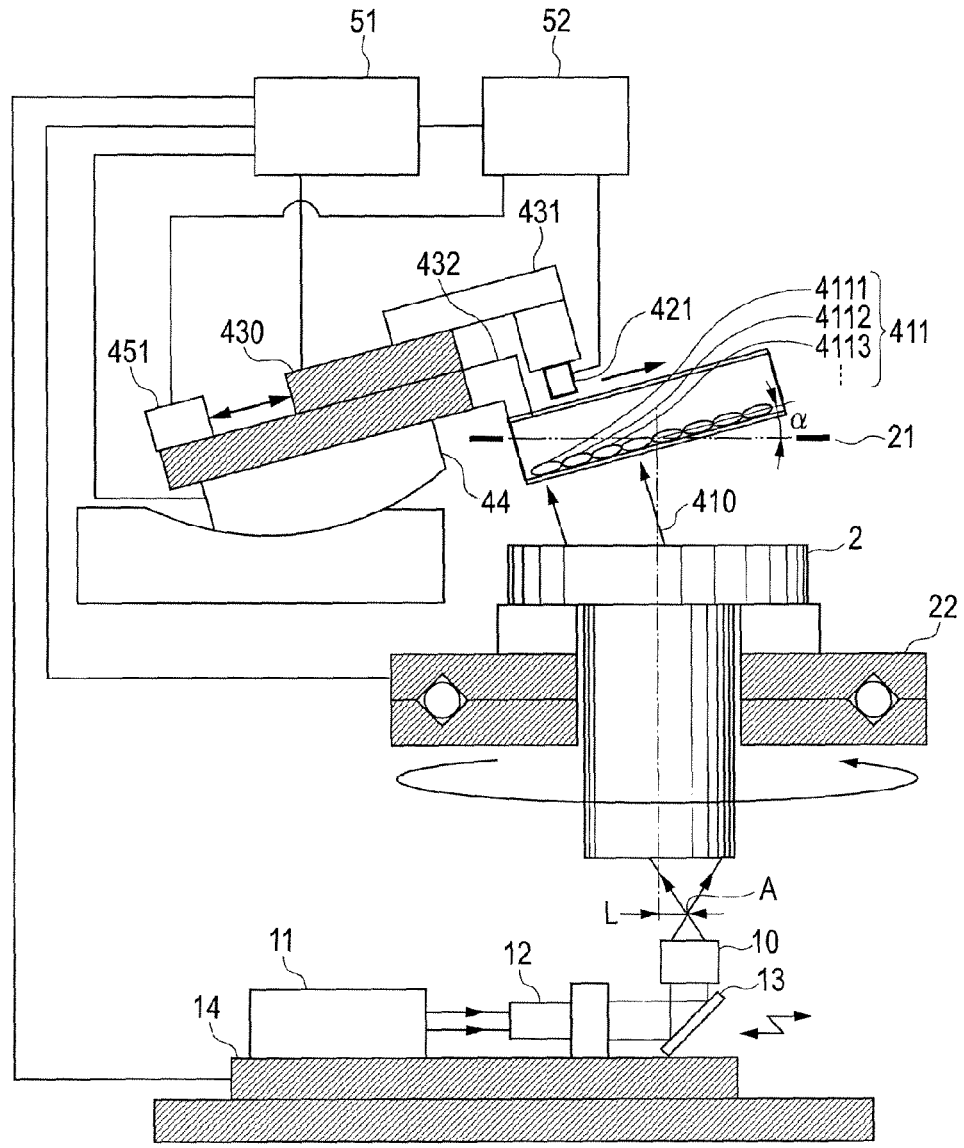
FIG. 8 is a front cross-sectional view for showing an outlook structure of a wavefront aberration measuring device, according to a third embodiment of the present invention.
Figure 9:
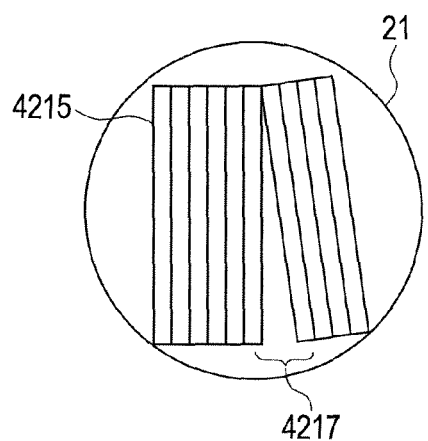
FIG. 9 is a plane view on a pupil surface of the objective lens, for showing an area or region to be photographed by a 1-dimensional sensor on the pupil of the objective lens when the stage has yawing.

A third embodiment of the present invention will be explained by referring to FIGS. 8 and 9. FIG. 8 shows the structure of other apparatus for obtaining the picture or image of the pupil 21. The contractual elements same to those of the first embodiment are attached with the same reference numerals. An aspect of the third embodiment differing from those of the first and second embodiments lies in that covering is made over an entire surface of the pupil 21 of the objective lens 2 while fixing a lens array 411. Thus, the lens array 411 is constructed with a large number of minute lenses 4111, 4112, 4113 . . . , being aligned or arranged in a lattice manner within the region covering the entire surface of the pupil 21 of the objective lens 2, and photographing is made on the spots of condensed light, respectively, by the minute lenses 4111, 4112, 4113 . . . of the lens array 411 through scanning the 1-dimensional sensor 421 in one direction while fixing this array lens 411 on the gonio-stage 44 through a fixing member 432.

The 1-dimensional sensor 421 has an image pickup area or region, being equal to or larger than the diameter of the pupil 21, in the direction perpendicular to the paper surface on FIG. 8, and is mounted on a 1-axis stage 430. A moving distance of the 1-axis stage 430 is measured by means of a laser measuring apparatus 451. Driving of the 1-axis stage 430 is executed by the controller system 51, and the processor system 52 composes a 2-dimensional picture from the 1-dimensional image, which is photographed by the lens array 411, upon basis of a position signal of the laser measuring apparatus 451. With this, it is possible to pick up an image of a large pupil, which cannot be photographed, directly, by a 2-dimensional CCD, through one (1) time of scanning in one (1)

direction. Herein, in FIG. 9 is shown a locus of photographing area or region 4215 of the 1-dimensional sensor 421. When a yawing error or shift is generated on the 1-axis stage 430, a rotation error 4217 is generated in the image pickup region thereof.

Figure 10:
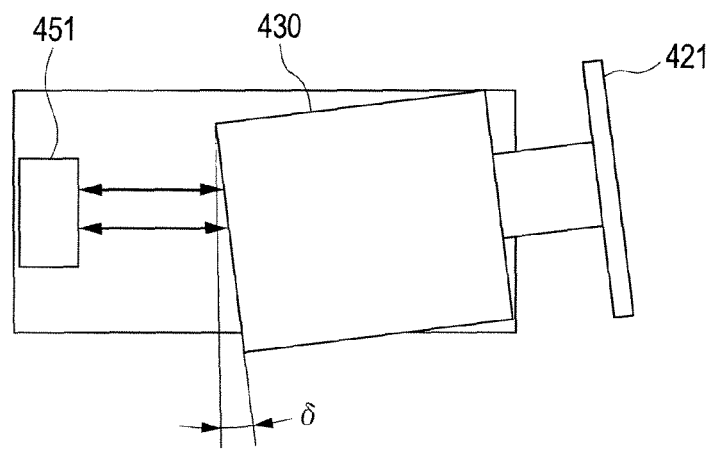
FIG. 10 is a plane view of a 1-axis stage, for showing a condition of measuring the yawing between the 1-axis stage and a laser measuring instrument, by the laser measuring instrument.

In FIG. 10 is shown a plane view of the 1-axis stage 430. Since making measurement with using two (2) axis beams, the laser measuring apparatus 451 is able to measure the yawing angle δ of the 1-axis stage 430. The processor system 52 corrects or compensates the rotation error 4217 in the photographing region upon the yawing angle δ of the 1-axis stage 430 measured, when composing the picture. With this, the 1-axis stage 430 is able to measure the wavefront aberration, correctly, even if not having high accuracy. Further, in case of applying the 1-dimensional sensor 421 therein, since an influence of the pitching of the 1-axis stage 430 stays within one (1) pixel in the scanning direction, it brings about almost no ill influence upon the accuracy for measuring the wavefront aberration.

Embodiment 4

Figure 11:
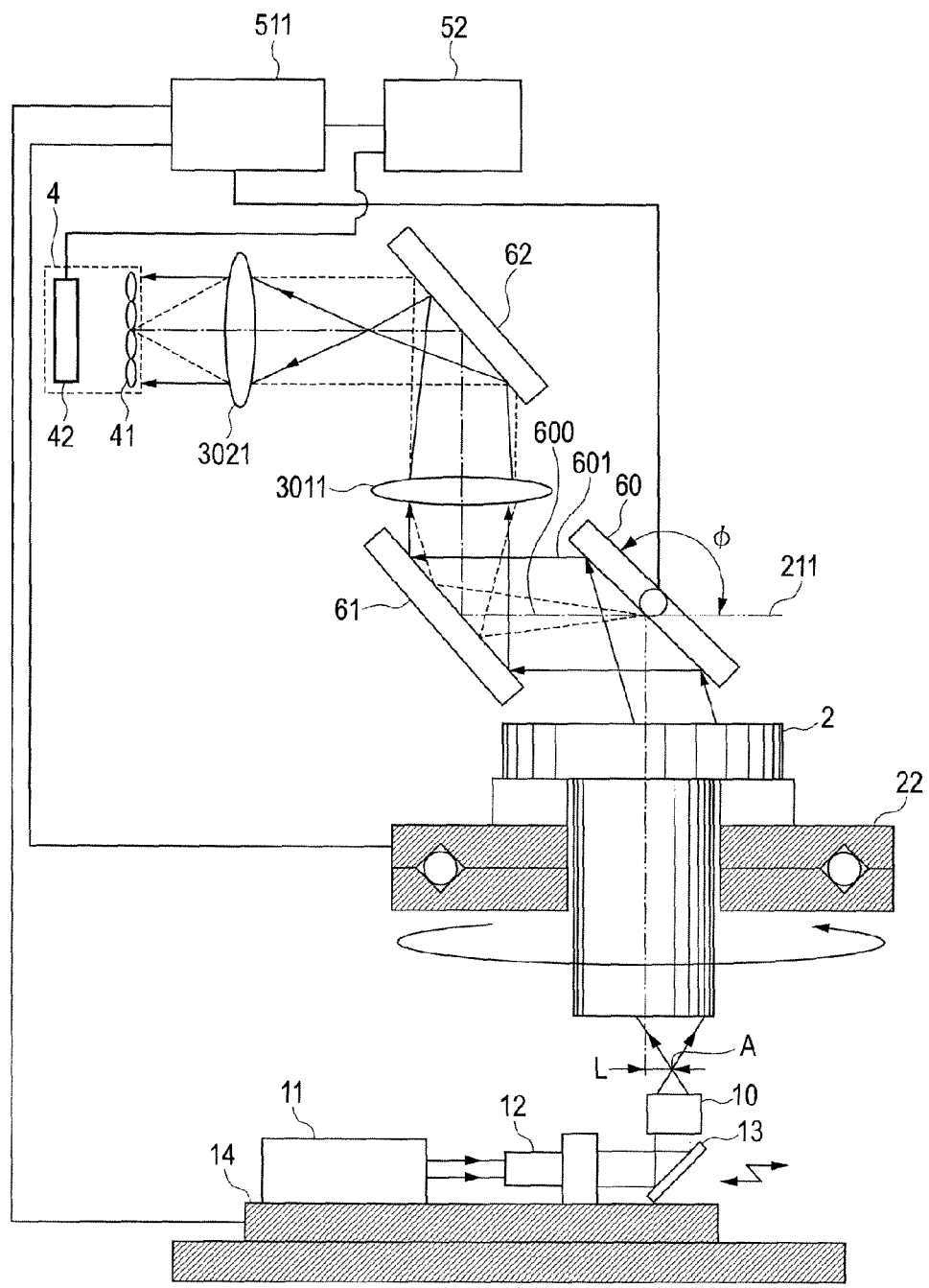
FIG. 11 is a front cross-sectional view for showing an outlook structure of a wavefront aberration measuring device, according to a fourth embodiment of the present invention.

A fourth embodiment of the present invention will be explained by referring to FIG. 11. This FIG. 11 shows the structure of a wavefront aberration measuring device, for always correcting or compensating an inclination of wavefront, which is generated when a measuring point "A" lies out of an axis, in a predetermined direction. The constituent elements same to those of the first embodiment are attached with the same reference numerals thereof.

In case where an enough space lies between the surface of the pupil 21 and the objective lens 2, it is possible to dispose a galvano-mirror 60 at the position of a pupil surface 211. A controller system 511 calculates a distance "L" of the measuring point "A" up to the optical axis, from a position signal of the stage 14 (e.g., a signal obtained by detecting the position of the stage 14 by a position sensor, such as, the laser measuring apparatus not shown in the figure, etc.), and obtains the inclination angle α (see FIG. 1) of the wavefront on the pupil surface with applying the (Eq. 1); thereby, controlling an angle φ of the galvano-mirror 60 in such a manner that a reflection light 601 always faces to the direction of the optical axis 600. In more details, the reflection light 601 can be controlled to face to the direction of the optical axis 600, through inclining the galvano-mirror 60 only by α/2 with respect to the inclination angle α. The reflection light 601 enters on the Shack-Hartmann sensor 4, in the form of parallel light, through a fixed mirror 61, a relay lens 3011, a fixed mirror 62 and a relay lens 3021.

Figure 12:
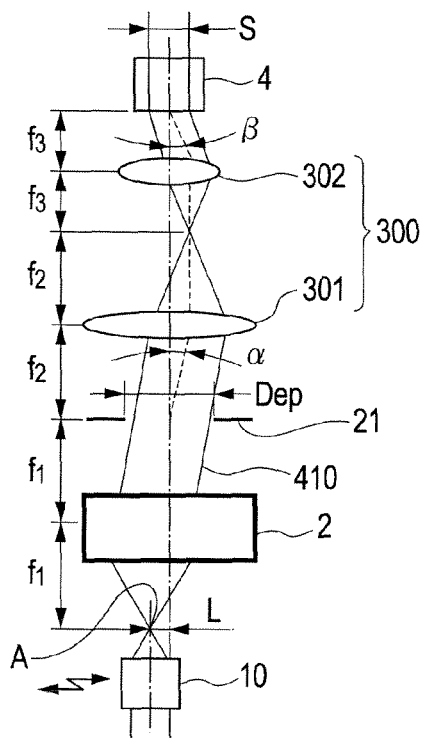
FIG. 12 is an outlook cross-sectional view on a front surface of an optical system, for showing an outlook structure for measuring a wavefront aberration of the objective lens through the relay lens.
Figure 13:
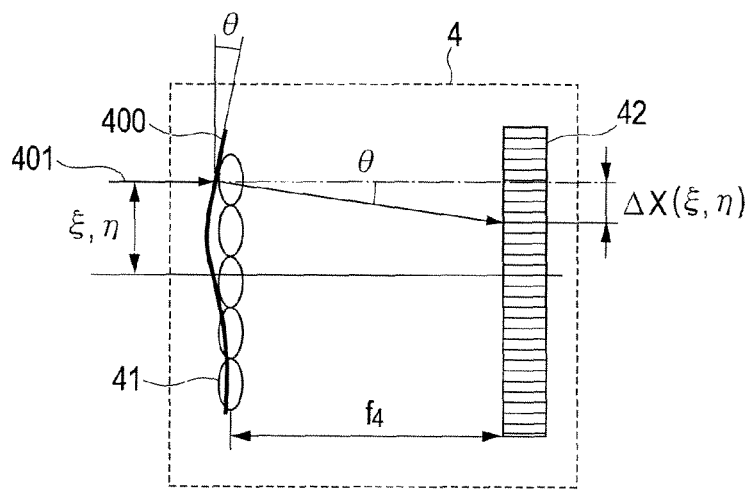
FIG. 13 is a plane cross-sectional view of the Shack-Hartmann sensor, for showing a position where lights are condensed on the 2-dimensional sensor by the array lens when a wavefront has a local inclination.

In this structure, the Shack-Hartmann sensor 4 is supported by a supporting member, which is not shown in the figure. The relay lenses 3011 and 3021 have the same structures of the relay lenses 301 and 302 shown in FIG. 12, wherein the distance on the optical axis between the relay lens 3011 and the pupil surface 211 is determined by the focus distance f2 (see FIG. 12), the distance between the relay lens 3021 and the array lens 41 by the focus distance f3 of the relay lens 3021, and the distance on the optical axis of the relay lenses 3011 and 3021 by f2+f3, respectively. With this, the array lens 41 has a conjugate relationship between the pupil surface 211, and upon the array lens 41 enters the wavefront having an entire inclination angle of zero (0) and a phase distribution equal to that on the pupil surface 211. The magnification obtained by the relay lens 3011 and the relay lens 3021 is so determined, that it satisfies the (Eq. 2).

According to the present embodiment, there is no necessity of moving the Shack-Hartmann sensor 4, depending on the position of the measuring point "A", i.e., it may be always disposed at a fixed position. Since only control of the galvano-mirror 60 is necessary, it is possible to make the measurement of the wavefront aberration out of the axis, with the structure, being simple or easy comparing to that of the embodiments 1 through 3.

APPLICABILITY ON THE INDUSTRIES

As was explained in the above, according to the present invention, it is possible to carry out a lens management for achieving optical inspection apparatuses, having no difference in sensitivity thereof between those machines, in the semiconductor wafer manufacturing line. Also, in the laser machining apparatus for use of the printed-circuit board, it is possible to execute the lens management for ensuring a uniformity of machining configuration all over the scanning region. Further, the present invention is also applicable in an inspection of defect(s) on a hard disk, or on a substrate for use of, such as, a liquid crystal or plasma television, or an organic EL, etc., or a laser machining, a laser correction, etc., for maintain or ensuring the sensitivity and/or the uniformity of the machining configuration, and with this, it is possible to achieve production of those devices at high yield rate.

EXPLANATION OF MARKS

10 . . . condensing lens, 11 . . . light source, 12 . . . beam expander, 13 . . . reflection mirror, 14 . . . stage, 15 . . . 2-dimensional sensor, 2 . . . objective lens, 21 . . . pupil, 211 . . . pupil surface, 22 . . . rotation stage, 200 . . . optical axis, 301 . . . relay lens, 302 . . . relay lens, 4 . . . Shack-Hartmann sensor, 41 . . . array lens, 42 . . . 2-dimensional sensor, 421 . . . 1-dimensional sensor, 430 . . . 1-axis stage, 451 . . . laser measuring apparatus, 43 . . . stage, 44 . . . gonio-stage, 45 . . . auto-collimator, 46 . . . Z-stage, 51 . . . controller system, 52 . . . processor system, 60 . . . galvano-mirror, 61 . . . reflection mirror, and 62 . . . reflection mirror.

What is claimed is:

1. A wavefront aberration measuring device, comprising:
a first table means being movable on a plane surface;
a point light source forming means for forming a point light source, being mounted on said first table means;
a second table means for mounting a measuring object thereon, being able to rotate;
a Shack-Hartmann sensor for detecting a light emitting from the point light source, which is formed by said point light source forming means, and transmitting through a lens to be inspected, which is mounted on said second table means; and
a signal processing means for processing an output signal from said Shack-Hartmann sensor detecting the light, and thereby obtaining wavefront aberration of said lens to be inspected, and further comprising
an adjustment means, wherein said adjustment means adjusts an inclination and a position of said Shack-Hartmann sensor or an optical path of the light transmitting through said lens to be inspected, so that the light emitting from the point light source of said point light source forming means and transmitting through the lens to be inspected, which is mounted on said second table means, is detected by said Shack-Hartmann sensor upon a pupil surface of said lens to be inspected or a surface conjugate with said pupil surface, depending on a position of said point light source.

2. The wavefront aberration measuring device, as described in the claim 1, wherein said adjustment means comprises a gonio-stage for adjusting an inclination angle of said Shack-Hartmann sensor and a table movable within a plane surface for adjusting the position of said Shack-Hartmann sensor on the pupil surface of said lens to be inspected.

3. The wavefront aberration measuring device, as described in the claim 1, wherein said adjustment means has a rotatable mirror for adjusting the optical path of said transmitting light on the pupil surface of said lens to be inspected, so that the light emitting from said point light source and transmitting through the lens to be inspected, which is mounted on said second table means, can propagate along an optical axis of said lens to be inspected, and a relay lens for transmitting the light, the optical path of which is adjusted on by said rotatable mirror and for forming a conjugate surface with said pupil surface, and on the surface conjugate with said pupil surface, which is formed by said relay lens is disposed said Shack-Hartmann sensor.

4. A wavefront aberration measuring device, comprising:
a point light source forming means for forming a point light source;
a first table means for mounting said point light source forming means thereon and being movable within a plane surface;
a second table means for mounting thereon a lens to be inspected, as an object of measurement;
a Shack-Hartmann sensor for detecting light emitting from said point light source, which is formed by said point light source forming means, and transmitting through the lens to be inspected, which is mounted on said second table means;
a supporting means for supporting said Shack-Hartmann sensor thereon;
a signal processing means for processing an output signal from the Shack-Hartmann sensor detecting said light, and thereby obtaining a wavefront aberration of said lens to be inspected; and
a controlling means for controlling an entire, wherein said supporting means has a gonio-stage for mounting said Shack-Hartmann sensor thereon and being able to oscillate around a 1-axis, and said controlling means drives said gonio-stage depending on a position of the point light source, which is formed by said point light source forming means, thereby controlling an inclination angle of said Shack-Hartmann sensor.

5. The wavefront aberration measuring device, as described in the claim 4, wherein said controlling means drives said first table means, thereby moving said point light source forming means within a substance surface of said lens to be inspected, and also drives said gonio-stage depending on distance between the point light source, which is formed by said point light source forming means, and an optical axis of the lens to be inspected, which is mounted on said second table means, thereby inclining said Shack-Hartmann sensor.

6. The wavefront aberration measuring device, as described in the claim 4, further comprising a third table means provided on said gonio-stage, wherein said supporting means supports said Shack-Hartmann sensor through said third table means, and said controlling means drives said gonio-stage depending on a position of the point light source, which is formed by said point light source forming means, thereby to control an inclination angle of said Shack-Hartmann sensor, and also drives said third table means, thereby to control a position of said Shack-Hartmann sensor.

7. A wavefront aberration measuring method, comprising the following steps of:
forming a point light source by condensing light emitting from a light source;
detecting the light emitting from said point light source and transmitting through a lens to be inspected by a Shack-Hartmann sensor; and
processing an output signal from the Shack-Hartmann sensor detecting said light transmitting through, thereby obtaining a wavefront aberration of said lens to be inspected, wherein:
an inclination and a position of said Shack-Hartmann sensor or an optical path of the light transmitting through said lens to be inspected is adjusted, in such that the light emitting from said point light source and transmitting through said lens to be inspected can be detected by said Shack-Hartmann sensor, upon a pupil surface of said lens to be inspected or a surface conjugate with said pupil surface, and
such an adjustment of the position of said Shack-Hartmann sensor that the light transmitting through said lens to be inspected can be detected by said Shack-Hartmann sensor upon the pupil surface of said lens to be inspected or the surface conjugate with said pupil surface is executed, by adjusting the optical path of said light transmitting through with using a mirror being rotatable on the pupil surface of said lens to be inspected, in such that the light emitting from said point light source and transmitting through said lens to be inspected can propagate along an optical axis of said lens to be inspected, and forming a surface conjugate with said pupil surface for transmitting the light, said optical path of which is adjusted, through a relay lens, and thereby detecting said light transmitting by said Shack-Hartmann sensor, which is disposed on said conjugate surface formed.

8. The wavefront aberration measuring method, as described in the claim 7, wherein such an adjustment of the position of said Shack-Hartmann sensor that the light transmitting through said lens to be inspected can be detected by said Shack-Hartmann sensor upon the pupil surface of said lens to be inspected or the surface conjugate with said pupil surface is executed, by mounting said Shack-Hartmann sensor on a gonoi-stage so as to control an inclination angle of said gonio-stage, and thereby adjusting the inclination angle of said Shack-Hartmann sensor with respect to the pupil surface of said lens to be inspected.

9. The wavefront aberration measuring method, as described in the claim 7, wherein such an adjustment of the position of said Shack-Hartmann sensor that the light transmitting through said lens to be inspected can be detected by said Shack-Hartmann sensor upon the pupil surface of said lens to be inspected or the surface conjugate with said pupil surface is executed, by mounting said Shack-Hartmann sensor on a table, which is mounted on a gonio-stage and movable at least in one axis direction so as to control an inclination angle of said gonoi-stage, thereby controlling a position of said gonio-stage by said table.

* * * * *